(12) United States Patent
Pighin et al.

(10) Patent No.: US 12,287,412 B2
(45) Date of Patent: Apr. 29, 2025

(54) ACCOUNTING FOR ATMOSPHERIC AND TERRESTRIAL OBSTACLES IN GEOGRAPHIC POSITIONING

(71) Applicant: Google LLC, Mountain View, CA (US)

(72) Inventors: Fred P. Pighin, Sausalito, CA (US);
Daniel J. Filip, San Jose, CA (US);
Scott Ettinger, San Carlos, CA (US);
Bryan Klingner, Austin, TX (US);
David Martin, Oakland, CA (US)

(73) Assignee: Google LLC, Mountain View, CA (US)

( * ) Notice: Subject to any disclaimer, the term of this patent is extended or adjusted under 35 U.S.C. 154(b) by 73 days.

(21) Appl. No.: 17/968,398

(22) Filed: Oct. 18, 2022

(65) Prior Publication Data

US 2023/0040113 A1 Feb. 9, 2023

Related U.S. Application Data

(62) Division of application No. 17/085,187, filed on Oct. 30, 2020, now Pat. No. 11,506,795, which is a division of application No. 15/843,002, filed on Dec. 15, 2017, now Pat. No. 10,852,444, which is a division of application No. 13/826,699, filed on Mar. 14, 2013, now Pat. No. 9,885,789.

(51) Int. Cl.
*G01S 19/40* (2010.01)
*G01S 19/07* (2010.01)
*G01S 19/05* (2010.01)
*G01S 19/42* (2010.01)

(52) U.S. Cl.
CPC .............. *G01S 19/40* (2013.01); *G01S 19/07* (2013.01); *G01S 19/073* (2019.08); *G01S 19/05* (2013.01); *G01S 19/42* (2013.01)

(58) Field of Classification Search
CPC ........ G01S 19/05; G01S 19/07; G01S 19/073; G01S 19/40; G01S 19/42
USPC ............ 342/357.23, 357.25, 357.42, 357.44; 701/469
See application file for complete search history.

(56) References Cited

U.S. PATENT DOCUMENTS

| | | | |
|---|---|---|---|
| 7,116,268 B2 | 10/2006 | Akano | |
| 7,541,975 B2 * | 6/2009 | Sever | G01S 19/28 342/357.48 |
| 7,630,737 B2 | 12/2009 | Pande et al. | |
| 7,647,171 B2 | 1/2010 | Horvitz et al. | |

(Continued)

FOREIGN PATENT DOCUMENTS

| | | | | |
|---|---|---|---|---|
| EP | 2458406 A1 * | 5/2012 | ............. | G01S 19/22 |
| WO | WO-2009016242 A1 * | 2/2009 | ............. | G01S 5/14 |
| WO | WO-2009017393 A1 * | 2/2009 | ............. | G01S 19/22 |

*Primary Examiner* — Chuong P Nguyen
(74) *Attorney, Agent, or Firm* — Lerner David LLP

(57) ABSTRACT

A position fix identifying a geographic location of a receiver is received. The position fix was generated using signals received at the receiver from respective high-altitude signal sources (such as satellites). Imagery of a geographic area that includes the geographic location is also received. The imagery is automatically processed to determine whether one or more of the high-altitude signal sources were occluded from the geographic location when the position fix was generated. In response to determining that one or more of the high-altitude signal sources were occluded from the geographic location when the position fix was generated, the position fix is identified as being potentially erroneous.

20 Claims, 9 Drawing Sheets

(56) References Cited

U.S. PATENT DOCUMENTS

| | | |
|---|---|---|
| 7,907,088 B2 | 3/2011 | Terashima et al. |
| 7,911,988 B2 | 3/2011 | Riley et al. |
| 8,165,807 B2 | 4/2012 | Garin |
| 8,184,563 B2 | 5/2012 | Riley et al. |
| 8,510,077 B1 | 8/2013 | Zhang et al. |
| 8,717,233 B2 | 5/2014 | Ashjaee et al. |
| 8,912,953 B2 | 12/2014 | Jeong et al. |
| 8,941,537 B2 * | 1/2015 | Ben-Moshe ............ G01S 19/22 342/357.61 |
| 9,448,307 B2 * | 9/2016 | Ben-Moshe ............ G01S 19/40 |
| 9,562,976 B2 | 2/2017 | van Diggelen et al. |
| 9,766,349 B1 * | 9/2017 | Madhow ................ G01S 19/11 |
| 10,078,138 B2 | 9/2018 | Chhokra et al. |
| 10,139,234 B2 | 11/2018 | Matthews |
| 10,175,363 B2 * | 1/2019 | Madhow ................ G01S 19/11 |
| 10,386,493 B2 * | 8/2019 | Irish .................... G01S 19/22 |
| 10,481,274 B2 * | 11/2019 | Ben-Moshe ............ G01S 19/31 |
| 10,656,282 B2 * | 5/2020 | Irish .................... G01S 19/428 |
| 10,802,157 B2 * | 10/2020 | Chhokra ................ G01S 19/45 |
| 10,955,561 B2 * | 3/2021 | Irish .................... G01S 19/42 |
| 11,169,274 B2 * | 11/2021 | Viswanathan ......... G01S 19/28 |
| 11,187,534 B2 | 11/2021 | Knutson et al. |
| 11,288,522 B2 | 3/2022 | Marschner et al. |
| 11,781,868 B2 * | 10/2023 | Knutson ................ G01S 19/22 342/357.3 |
| 11,960,011 B2 * | 4/2024 | Karvounis ............ G01S 19/11 |
| 2005/0259658 A1 | 11/2005 | Logan et al. |
| 2007/0005243 A1 | 1/2007 | Horvitz et al. |
| 2008/0114543 A1 | 5/2008 | Vishnu |
| 2009/0213112 A1 | 8/2009 | Zhu et al. |
| 2010/0176992 A1 | 7/2010 | T'Siobbel |
| 2011/0105149 A1 | 5/2011 | Riley et al. |
| 2012/0283947 A1 | 11/2012 | T'Siobbel |
| 2013/0278466 A1 | 10/2013 | Owen |
| 2013/0285849 A1 | 10/2013 | Ben-Moshe et al. |
| 2014/0062777 A1 | 3/2014 | MacGougan et al. |
| 2014/0358426 A1 | 12/2014 | Kim |
| 2015/0338524 A1 | 11/2015 | Ben Moshe et al. |
| 2017/0067999 A1 | 3/2017 | Chhokra et al. |
| 2019/0094379 A1 | 3/2019 | Chhokra et al. |
| 2020/0132858 A1 * | 4/2020 | Viswanathan ........ G01S 19/426 |
| 2023/0035711 A1 * | 2/2023 | Zheng .................. G01S 19/426 |
| 2023/0059402 A1 * | 2/2023 | Van Sickle ............ G01S 19/28 |

* cited by examiner

ACCOUNTING FOR ATMOSPHERIC AND TERRESTRIAL OBSTACLES IN GEOGRAPHIC POSITIONING

CROSS-REFERENCE TO RELATED APPLICATIONS

The present application is a divisional of U.S. patent application Ser. No. 17/085,187, filed on Oct. 30, 2020, which is a divisional of U.S. patent application Ser. No. 15/843,002, filed on Dec. 15, 2017, now U.S. Pat. No. 10,852,444, which is a divisional of U.S. patent application Ser. No. 13/826,699, filed on Mar. 14, 2013, now U.S. Pat. No. 9,885,789, the disclosures of which are incorporated herein by reference.

FIELD OF TECHNOLOGY

The present disclosure relates generally to geographic positioning techniques and, more particularly, to real-time and/or post-processing corrections for position fixes calculated by geographic positioning receivers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Receivers, such as portable geographic positioning receivers, commonly use signals from satellites to obtain a "position fix," or an estimate of the current geographic location. Generally speaking, a receiver calculates the position fix by analyzing the time multiple satellite signals take to reach the receiver from known locations. In the systems available today, there must be a clear line of sight between the receiver and at least four satellites at the time of positioning to obtain an accurate position fix. A clear line of sight refers to a path from the satellite to receiver void of any obstacles that may completely block the satellite signal. Four satellites are needed to estimate four unknowns: the three-dimensional position of the receiver and the time offset of the receiver clock.

Often, objects such as trees occlude satellite signals from the receiver. Such occlusions should prevent the calculation of a position fix, but in practice a receiver may still receive a signal from an occluded satellite after the signal reflects off surrounding obstacles. In these situations, the receiver often obtains an erroneous position fix. Moreover, even when a receiver has a line of sight to four or more satellites, atmospheric factors such as temperature, pressure, and humidity sometimes affect signal propagation so as to introduce error in calculating a position fix.

SUMMARY

According to one implementation, a method for identifying potentially erroneous position fixes of a receiver is implemented in a computing system. The method includes receiving a position fix identifying a geographic location for a receiver. The position fix was generated using a plurality of signals received at the receiver from respective high-altitude signal sources (such as satellites). The method also includes receiving imagery of a geographic area that includes the geographic location. Further, the method includes automatically processing the imagery to determine whether one or more of the high-altitude signal sources were occluded from the geographic location when the position fix was generated. In response to determining that one or more of the high-altitude signal sources were occluded from the geographic location when the position fix was generated, the method includes identifying the position fix as potentially erroneous.

In another implementation, a computing system includes one or more processors and a computer-readable medium communicatively coupled to the one or more processors and storing a plurality of instructions. When executed on the one or more processors, the instructions cause the computing system to (i) receive a position fix specifying a geographic location of a receiver, where the position fix was generated using a plurality of signals received at the receiver from respective signal sources disposed above a geographic area including the geographic location, (ii) receive an obstacle map that indicates (a) first portions of the geographic area in which there is an unobstructed line of sight between an object disposed at a surface level and a signal source disposed at a level significantly higher than the surface level and (b) second portions of the geographic area in which the line of sight between the object and the signal source is obstructed, and (iii) using the specified geographic location and the received obstacle map, determine whether the plurality of signals reached the receiver without encountering one or more obstacles.

In another implementation, a method for identifying line-of-sight conditions in geographic positioning is implemented in a computing system on one or more processors. The method includes receiving an image of a geographic area. The method further includes processing the image using the one or more processors to identify obstacles that obstruct a line of sight between (i) a receiver disposed within the geographic area substantially at a surface level and (ii) a signal source disposed above the geographic area at a level significantly higher than the surface level. Still further, the method includes generating an obstacle map based on the identified obstacles using the one or more processors, where the obstacle map indicates (i) first portions of the geographic area in which there is an unobstructed line of sight between the receiver and the signal source, and (ii) second portions of the geographic area in which the line of sight between the receiver and the signal source is obstructed.

In yet another implementation, a computer-based method is for improved geopositioning of a receiver that receives positioning signals from a set of N signal sources. The method includes (i) selecting a subset of M signal sources from among the N signal sources, such that M<N. The method further includes (ii) generating a candidate position fix using the positioning signals that correspond to the selected subset, where the candidate position fix identifies a geographic location, and (iii) determining whether each of the M signal sources had an unobstructed line-of-sight to the geographic location when the position fix was generated using imagery of a geographic area associated with the geographic location. According to the method, if at least one of the M signal sources had an obstructed line-of-sight to the geographic location, the acts (i)-(iii) for a new subset of M signal sources. The method also includes generating a position fix using one or more candidate position fixes for which each of the M signal sources had an unobstructed line-of-sight to the respective geographic location.

DETAILED DESCRIPTION

Figure 1:
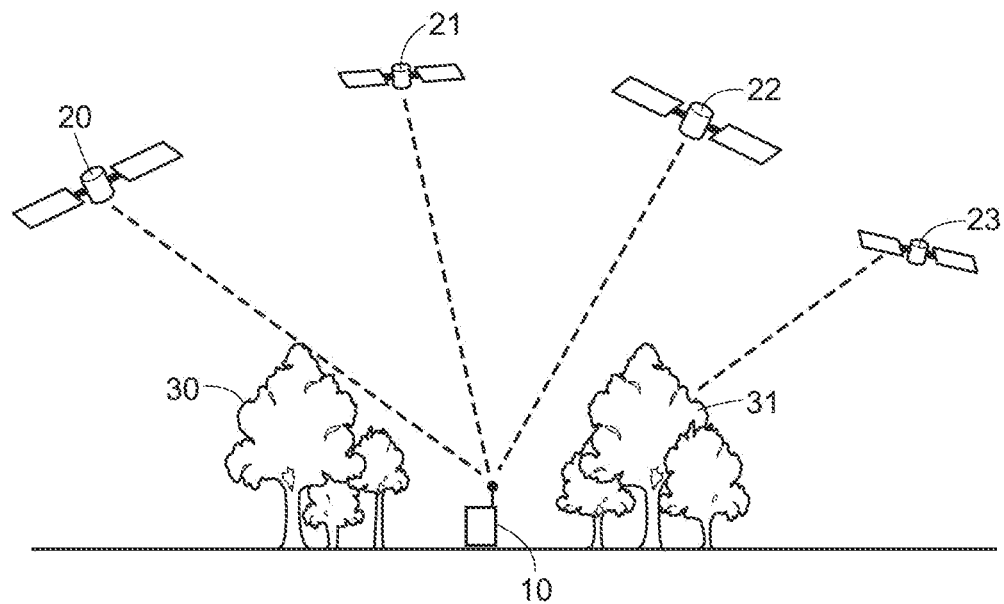
FIG. 1 illustrates an example environment in which obstacles occlude satellite signals from a geographic positioning receiver.

The techniques of the present disclosure can be utilized in situations where a signal travelling from a high-altitude source, such as a satellite, to a ground-based receiver, such as a portable geographic positioning receiver, encounters various terrestrial or atmospheric obstacles. Generally speaking, these obstacles prevent the signal from reaching the receiver in the time it would take the signal to traverse the same distance in vacuum along a direct line. In one example scenario, a signal encounters obstacles, located on the direct path between the satellite and the receiver, that block the signal completely or redirect the signal onto a longer path to the receiver. This scenario is discussed in more detail below with reference to FIG. 1. In another example scenario, the medium between the satellite and the receiver slows down the signal while leaving the signal path, for the most part, unaltered. This scenario is discussed in more detail below with reference to FIG. 6. Positioning calculations based on signals that encounter occluding obstacles and/or decelerating media contain potential errors, and the techniques of the present disclosure identify potentially erroneous position fixes and, in some cases, generate appropriate corrections.

More particularly, a line-of-sight verification module of the present disclosure identifies a potentially erroneous position fix by determining whether any of the signals used to generate the position fix were occluded. Thus, if the receiver generates a position fix corresponding to point P using signals from satellites $S_A$, $S_B$, $S_C$, and $S_D$, the line-of-sight verification module determines whether there is a clear line of sight between point P and each of the satellites $S_A$, $S_B$, $S_C$, and $S_D$. If there is no line of sight between point P and these satellites, the line-of-sight verification module determines that the position fix is potentially erroneous, i.e., the device probably is at a point other than point P. If there is a clear line of sight between point P and these satellites, the line-of-sight verification module does not flag the position as potentially erroneous (however, it will be understood that the line-of-sight verification module in this case cannot provide a positive confirmation that the position fix was accurate).

Depending on the implementation, the line-of-sight verification module analyzes obstacles in a two-dimensional (2D) or three-dimensional (3D) space. More particularly, the line-of-sight verification module can consider obstacles along a vertical path between a receiver and a satellite (relying on the disparity between the height of a typical obstruction and the height of a satellite orbit), or the line-of-sight verification module can analyze the obstacles in three dimensions to determine whether a nearby tall building occludes a satellite signal that arrives at a relatively acute angle, for example. These implementations are discussed in more detail below with reference to FIGS. 3 and 4, respectively.

According to some example implementations, a line-of-sight verification module analyzes imagery of natural or man-made terrain features captured from satellites, aircraft, or from the ground level to construct a 2D obstacle map of various occluding obstacles. The analysis can be based on comparing color patterns, shape recognition, etc. In other example implementations, the line-of-sight verification module receives satellite positioning data and analyzes 3D mesh geometry (generated using any suitable technique) to identify obstacles in a 3D space. As discussed in more detail below, the line-of-sight verification module can operate in a network device, in a network cloud, or even in the receiver.

Further, a line-of-sight verification module or another suitable component uses line-of-sight verification to more accurately select a subset of positioning signals to generate a position fix when additional positioning signals are available. More specifically, a receiver at some point may receive N positioning signals, and the line-of-sight verification module can assist the receiver in selecting from this set M positioning signals, where M<N, by eliminating subsets of positioning signals that yield potentially erroneous position fixes. Thus, when the receiver receives positioning signals from seven satellites, for example, and only four satellites are required for a position fix, the line-of-sight verification module may determine that a position fix generated using positioning signals from the first four satellites corresponds to a point that is occluded from one or several of the four satellites. The line-of-sight verification module then can "home in" on the set that does not yield a potentially erroneous position fix (but, again, the line-of-sight verification module does not necessarily provide a positive confirmation of accuracy).

Still further, in various embodiments, a position and atmospheric parameter estimation module efficiently estimates atmospheric parameters using "nonessential" or supplementary satellite signals (e.g., signals in addition to the minimum number of signals required for positioning) and calculates the delay of satellite signals using the estimated parameters, thereby improving position fixes in real-time or during post-processing. More particularly, this module can estimate temperature, pressure, and humidity using the supplementary satellite signals. The position and atmospheric parameter estimation module can cooperate with the line-of-sight verification module, or operate independently, in the receiver or in another device.

FIG. 1 depicts an example geographic positioning receiver 10 that may operate in a smartphone, a tablet computer, a laptop computer, or a car navigation system, for example. The receiver 10 receives signals from satellites 20, 21, 22, and 23 to generate a position fix. To this end, the receiver 10 (or a network component that assists the receiver 10) may determine how long each signal takes to reach the receiver 10. At the time illustrated in FIG. 1, obstacles such as tree canopies (or, simply, trees) 30 and 31 are located along the direct paths between the satellites 20, 22, and 23 and the receiver 10. The trees 31 may occlude the signal from satellite 23. In other words, there is a direct line of sight between each of the satellites 21, 22, and 20 and the receiver 10 but not between the satellite 22 and the receiver 10. It still may be possible for the receiver 10 to calculate a position fix based on signals that reflect off the obstacles 30-33 and indirectly reach the receiver 10. However, such a position fix is potentially erroneous because the reflected signals take longer to reach the receiver 10.

Figure 2:
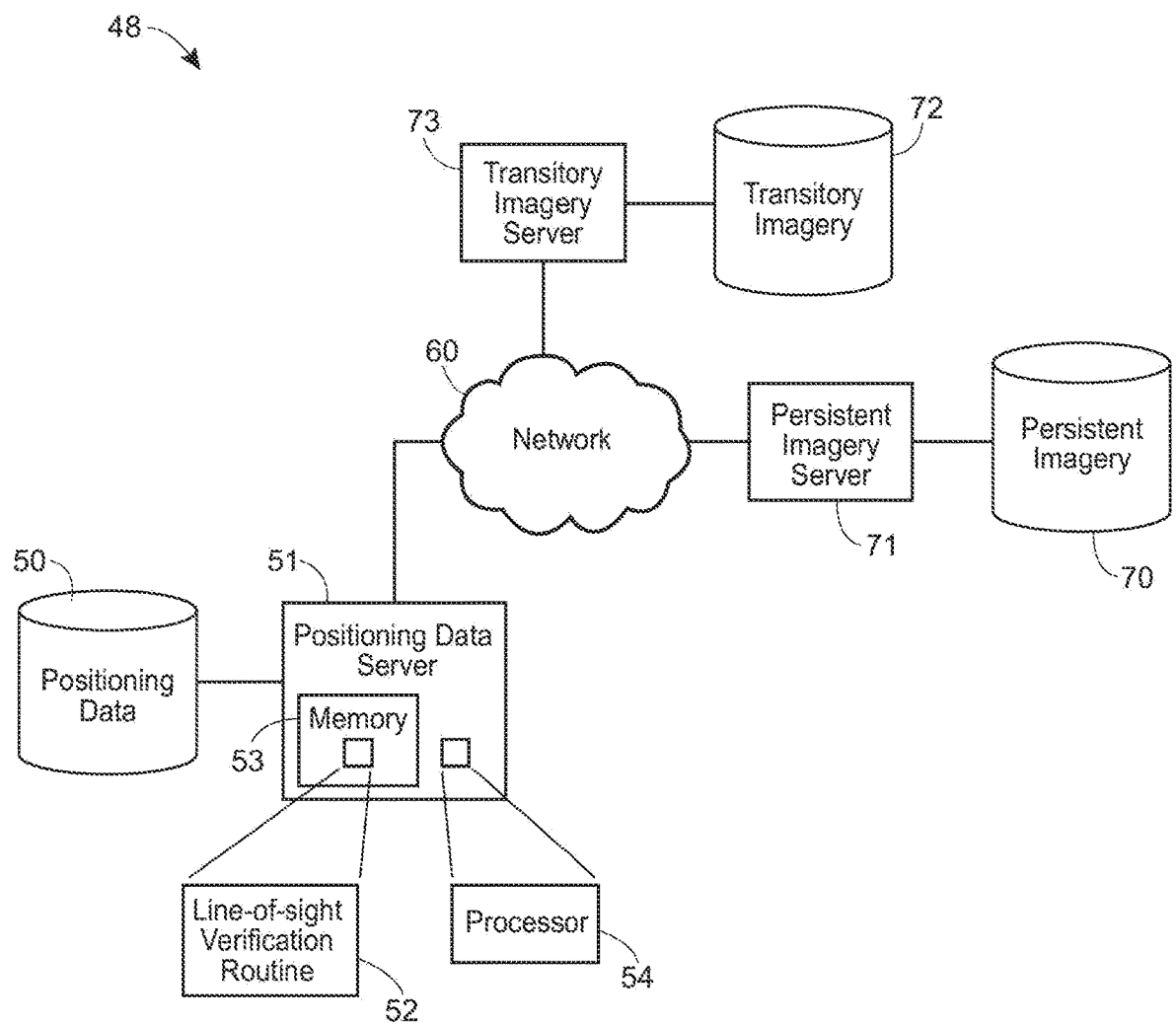
FIG. 2 illustrates an example computing system that identifies a potentially erroneous position fix due to occluded satellite signals such as those illustrated in FIG. 1.

FIG. 2 illustrates an example computing system 48 that can identify the position fix of FIG. 1 as being potentially erroneous. In general, the computing system 48 identifies potentially erroneous position fixes during post-processing of positioning data, i.e., after a receiver generates the corresponding position fix. A positioning database 50 stores position fixes collected from one or more receivers. In one example implementation, each record in the positioning database 50 includes a set of Global Positioning Service (GPS) coordinates and the corresponding timestamp. Receivers can submit position fixes to the positioning database 50 via a cellular telephone network, a wireless local area network (WLAN), or in any other suitable manner.

A positioning data server 51 may receive and manage data stored in the positioning database 50. The positioning data server 51 includes one or more processors 54 and a computer-readable memory 53 that stores a line-of-sight verification routine 52 in the form of instructions executable on the processor 54, for example. The positioning data server 51 is communicatively coupled to the positioning database 52 as well as a communication network 60 via one or more wired or wireless interfaces (not shown). The communication network 60 can be any suitable local area network or wide area network such as the Internet, for example.

In some implementations, the positioning data server 51 communicates with a persistent imagery server 71 coupled to a persistent imagery database 70 and a transitory imagery server 73 coupled to a transitory imagery database 72. The database 70 may store high-altitude or ground-level images suitable for identifying obstacles that generally do not change with time, such as certain trees, tall buildings, overpasses, natural formations such as canyons, etc. As a more specific example, the database 70 may store satellite and aerial images used to generate digital maps. These images typically are captured from a high altitude when the area is not obscured by clouds or shadows. It is also typical for such images to be considered up-to-date for a relatively long time (e.g., months or even years). Additionally or alternatively, the database 70 can store 3D geometry that includes terrain layer information and/or buildings and vegetation layer information for a geographic area, and/or photographic imagery from which 3D geometry can be derived.

On the other hand, the transitory imagery database 72 stores recently captured images that give an up-to-date indication of any changes in the terrain features of a geographic area. Relevant changes in the terrain features may be seasonal, such as trees losing leaves, for example, or the changes may be related to natural disasters, such as forest fires, for example. The images in the database 72 can be stored along with a relatively precise timestamp (e.g., one that includes hour and minute information).

To identify a potentially erroneous position fix, the positioning data server 51 may request imagery and/or 3D geometry (or imagery for deriving 3D geometry) from one or both of the servers 71 and 73 concurrent with positioning data 50 and corresponding to the approximate geographic area of the receiver. As a more specific example, the imagery request from the positioning data server 51 may include the latitude, the longitude, and an indication of time corresponding to the latitude and the longitude. The approximate geographic area of the receiver is an area that includes one or more of the position fixes stored in the positioning database 50. These position fixes could be erroneous, but the errors in the position fixes often will be small compared with the height of satellites and the size of obstacles. As such, the position fixes in the positioning database 50 are adequate to define the approximate geographic area of the receiver. In other implementations, the request from the positioning data server 51 may also include altitude information. In response, the persistent imagery server 71 may provide persistent imagery of an area centered around the point with the specified latitude and longitude and, when multiple images for the same area are available, generally matching specified time (e.g., same week or month). The transitory imagery server 73 may provide transitory imagery similarly centered around the point with the specified latitude and longitude, but the transitory imagery may match the specified time more precisely.

The imagery can be provided in any suitable electronic format, such as a bitmap or a JPEG image. Similarly, 3D geometry can be provided in any suitable format, such as mesh data, panoramic photographs, etc. In some scenarios, the imagery can be accompanied with metadata. For example, an image may include metadata related to color depth, image resolution, etc. In such as case, a line-of-sight verification routine may use the information contained in the metadata to appropriately preprocess the image (e.g. by applying an image filtering routine, cropping routine, etc.). In still other scenarios, some of the imagery can be provided in the form of data collected by range scanners, such as laser scanners.

When executed on the processor 54, the line-of-sight verification routine 52 uses the received persistent and/or transitory imagery to determine whether the approximate location corresponding to a certain position fix appears to have been occluded from satellites at the time of the position fix. In a certain implementation, the line-of-sight verification routine 52 can approximate the height of obstructions (an implementation discussed further in reference to FIG. 3). In another implementation, the line-of-sight verification routine 52 can set the height of the obstructions to zero because the height of the orbit of a typical satellite is much greater that the height of a typical obstruction (as discussed in more detail below). Following the latter implementation, to determine whether a receiver at a location with coordinates (x, y, z) has a line of sight to a satellite, the line-of-sight verification routine 52 can use the persistent and/or transitory imagery to determine whether there are obstacles at coordinates (x, y, z').

In one implementation, the line-of-sight verification routine 52 analyzes pixel color and/or shapes in the imagery to detect possible obstacles. Thus, for example, dark patches in a largely blue region and light patches in a largely green area may correspond to clouds that do not significantly attenuate satellite signals, and/or certain shapes may be recognized as tall buildings that define so-called "urban canyons," etc. Additionally, pixel gradients or textures having shades of green may indicate a forest canopy, and a combination of shapes into patterns may indicate other types of landscapes where occlusion is likely. A pattern of square or rectangle shapes may, for example, be recognized as an urban canyon or city, and dark finger-like shapes in an otherwise uniformly colored area may be recognized as natural canyons. Thus two-dimensional imagery provides information that can be used to identify many important obstacles and/or arrangements of obstacles that are vertically planar, such as tall buildings and trees, or horizontally planar, such as some cloud formations.

In another implementation, the line-of-sight verification routine 52 or another suitable module uses structure from motion (SFM) to identify regions that are an infinite distance from the receiver (sky). In still another implementation, the line-of-sight verification routine 52 or another suitable module uses three-dimensional (3D) models generated from laser scanner data to identify 3D obstacles such as buildings, for example. For example, the line-of-sight verification routine 52 can analyze contours of building facades relative to the location corresponding to the position fix in view of known positions of satellites. More generally, the line-of-sight verification routine 52 can use any suitable image processing techniques.

In some scenarios, the line-of-sight verification routine 52 receives a single position fix and a timestamp, determines whether the specified position fix is erroneous, and generates an appropriate indication. In other scenarios, the line-of-sight verification routine 52 constructs an obstacle map using the persistent imagery 70 from the persistent imagery server 71, the transitory imagery 72 from the transitory imagery server 73, or a combination of persistent imagery 70 and transitory imagery 72. Generally speaking, the obstacle map contains information regarding occluding obstacles surrounding the receiver or in another specified area. In some implementation, the obstacle map has an expiration date or time. The obstacle map can be used at the positioning data server 51, another network device, a device that includes a receiver (such as a smartphone), etc. An example use of an obstacle map is further discussed below.

It is noted that in some geographic areas, transitory imagery alone or persistent imagery alone is sufficient to construct an appropriate obstacle map. For example, transitory imagery depicting the current state of a forest canopy can be sufficient to verify a position fix in a forested area. On the other hand, verification of a position fix in a purely urban area can be made using persistent imagery alone. This use of persistent imagery alone may have certain advantages in cases where the environment is not changing with time. For example, retrieving only persistent imagery may be computationally efficient in comparison to searching for relevant up-to-date images. In yet another example, areas with a combination of buildings and trees, such as cities with parks, may benefit from the use of both persistent and transitory imagery.

Depending on the scenario, the positioning data server 51 may generate an imagery request in response to a user request, as part of a scheduled automatic task, or in response to any other suitable event. As one example, the positioning data server 51 may receive a sequence of position fixes corresponding to the track of a vehicle over a certain period of time. The line-of-sight verification routine 52 may automatically determine which of the position fixes, if any, are unreliable.

Figure 3:
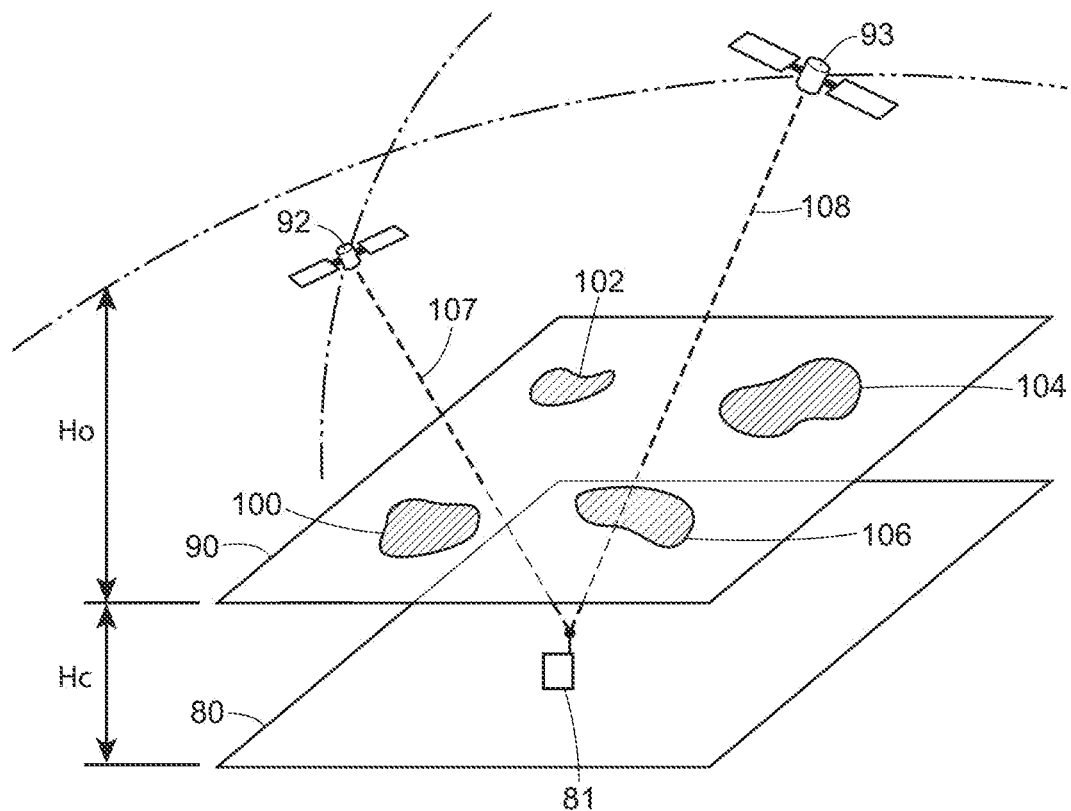
FIG. 3 illustrates an example two-dimensional obstacle map which the system of FIG. 2 may generate to identify a potentially erroneous position fix.

FIG. 3 illustrates a two-dimensional (2D) obstacle map that is generated by a line-of-sight verification routine, such as the line-of-sight verification routine 52 in FIG. 2. A positioning receiver 81, which may be similar to the receiver 10 discussed above, is disposed on a plane 80. An obstacle map 82 in this scenario is a 2D obstacle map that is associated with height $H_C$ above the plane 80. The obstacle map 82 includes obstacles, such as buildings or trees, that prevent a clear line-of-sight between the satellites 83 and 84 and the receiver 81. The satellites 83 and 84 are at a height $H_O$ above the obstacle map 82. The obstacle map 82 contains regions 90, 91, 92, and 93 representing occlusions, and the remaining area of the obstacle map 82 represents regions through which a satellite signal passes unobstructed. In this example, the receiver 81 has a clear line-of-sight 95 to the satellite 83, whereas the satellite 84 is occluded from the receiver 81, as indicated by a line 94 passing through the region 93.

In most cases, the two-dimensional obstacle map 82 provides a good approximation of obstacles, even though these obstacles are actually three-dimensional. The 2D obstacle map 82 can indicate areas where vertically planar three-dimensional objects, such as tall buildings, are located based on the analysis of shapes or patterns, as discussed above. Also, for simplicity, the 2D obstacle map can be associated with the same plane as the receiver. i.e., $H_C \approx 0$. Satellites used by receivers for geographic positioning are often at altitudes between 1,200 to 22,200 miles above the surface of the earth. The height or altitude of terrestrial obstacles, such as building and trees, is small compared with the altitude of such satellites, i.e., $H_O \gg H_C$. The difference in altitude at which different obstacles are disposed is also small in most cases. Thus, if all relevant occluding obstacles are near the surface of the earth as compared with the height of the high-altitude signals, a 2D obstacle map associated with the plane of the receiver is generally sufficient for determining whether the receiver has a line of sight to satellites.

In other implementations, the 2D obstacle map 82 is associated with a certain non-zero height, i.e., $H_C > 0$. For example, $H_C$ can be assigned a certain value based on the average height at which the buildings or trees of a certain geographic area occlude satellite signals, or the value of $H_C$ can be generated dynamically for a particular scenario. In any case, the value of $H_C$ along with known positions of the satellites 83 and 84 can be taken into account to determine the incident angle of the signals from the satellites 83 and 84. Thus, an obstacle directly above a receiver in some cases may not occlude some (or any) of the satellite signals.

Figure 4:
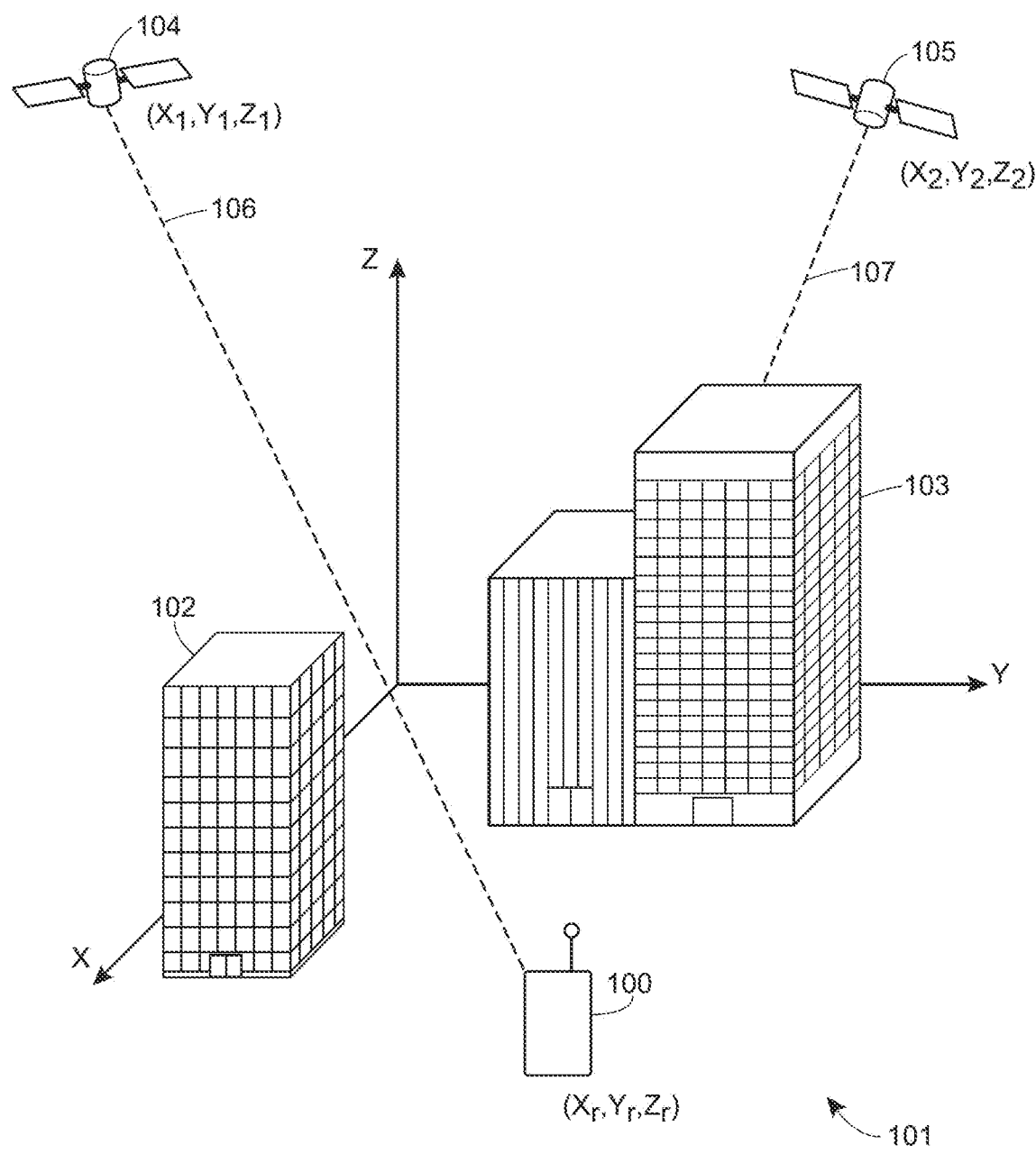
FIG. 4 illustrates an example three-dimensional obstacle map which the system of FIG. 2 may generate to identify a potentially erroneous position fix.

FIG. 4 illustrates an example 3D scene that can be used as a 3D obstacle map in line-of-sight verification by a line-of-sight verification routine, such as the line-of-sight verification routine 52 in FIG. 2. A positioning receiver 100, which may be similar to the receiver 10 discussed above, is disposed on the xy plane (ground level). An obstacle map 101 in this scenario is a 3D obstacle map (indicated by a grid) with 3D obstacles representing terrain features in the environment of the receiver 100. These obstacles may be buildings, such as the buildings 102 and 103, for example. In some implementations, the 3D obstacles may be natural, such as rock outcroppings, trees, natural canyon walls, etc. and/or man-made features, such as buildings. Satellites 104 and 105 travel along well-known trajectories, and accordingly the line-of-sight verification routine 52 knows the position (x, y, z,) of each satellite at time t, with a relatively low error. In the scenario of FIG. 4, the satellites 104 and 105 are at positions $(x_1, y_1, z_1)$ and $(x_2, y_2, z_2)$, respectively.

In this example, the receiver 100 has a clear line of sight to satellite 104 as indicated by the line 106, but the receiver 100 does not have a clear line of sight to satellite 105. The 3D obstacle 103 thus obstructs the direct path 107 between the satellite 105 and the receiver 100.

A 3D obstacle map including 3D obstacles, such as the 3D obstacles 102 and 103 of the example 3D obstacle map 101, may be constructed based on ground-level laser scanner data or imagery, for example. A full or partial three-hundred and sixty degree laser scan or panoramic image may be analyzed by any appropriate 3D reconstruction technique, as known in the art, to construct a 3D model (obstacle map) of the environment surrounding the device 100. Such a 3D obstacle map is particularly useful in environments with many vertically planar obstacles, such as urban canyons.

Figure 5:
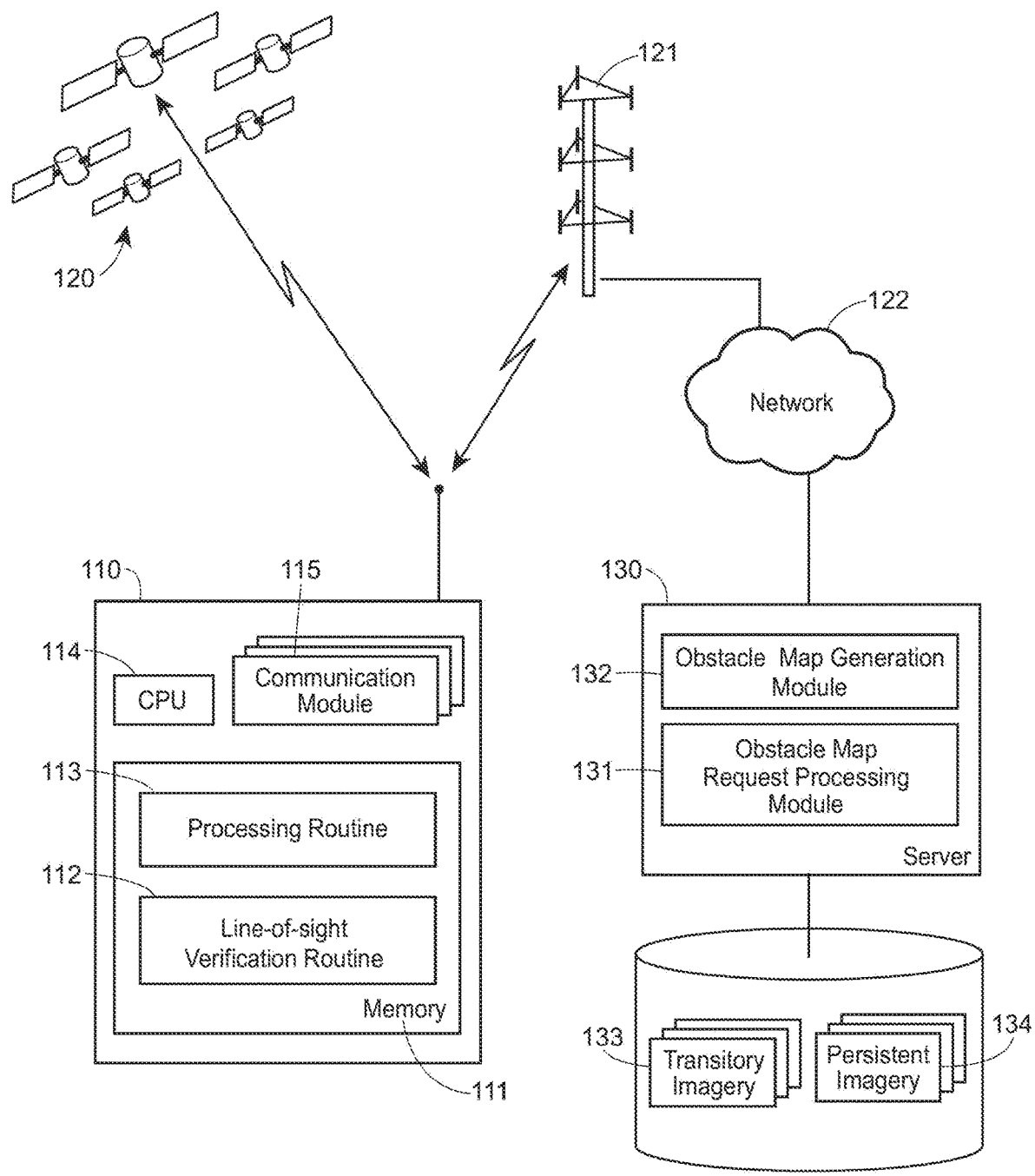
FIG. 5 illustrates an example computing system that identifies a potentially erroneous position fix during real-time positioning due to occluded satellite signals.

FIG. 5 illustrates another example system for identifying erroneous position fixes that includes a geographic positioning receiver 110 and a server 130, to which the receiver 110 is coupled via a antenna 121 and a communication network 122. Unlike the system of FIG. 2, the receiver 110 can determine whether a position fix is potentially erroneous substantially in real-time. In other words, the receiver 110 can determine whether a position fix being obtained is likely to be erroneous. The receiver 110 then may generate an appropriate indication for a user and/or automatically switch to another positioning technique (e.g., to using wireless "hotspots"), according to some implementations. Additionally, if desired, the receiver 110 also can determine whether a previously generated position fix is potentially erroneous.

The geographic positioning receiver 110 includes one or more processing units 114 and a computer-readable memory 111 that stores a line-of-sight verification routine 112 and a position fix processing routine 113 as sets of instructions executable by the processing unit 114. The receiver 110 also includes one or more communication modules 115 to communicate with satellites 120 and the antenna 121, for example. Similar to the receiver 10 discussed above, the receiver 110 uses signals from the satellites 120 to determine its current position.

The server 130 similarly includes a computer-readable memory and one or more processors (not shown) to store and execute, respectively, an obstacle map request processing module 131 and an obstacle map generation module 132. The server 130 is communicatively coupled to one or more database that store transitory imagery 133 and persistent imagery 134. In some implementations, the persistent and transitory imagery 133 and 134 may include images files, such as JPG images, and data from range scanners.

In operation, the line-of-sight verification routine 112 identifies occluded satellite signals using an obstacle map provided by the server 130. For example, when the receiver 110 begins to calculate a position fix, the receiver 110 also may request an obstacle map for the area in which the receiver 110 expects to be located based on recent position fixes stored in the memory 111 or other knowledge of the area in which the receiver 110 is operating.

Alternatively, when the positioning receiver 110 does not have a good estimate of a position fix prior to receiving signals from the satellites 120, the receiver 110 first obtains a position fix and then requests an obstacle map for the corresponding geographic area. The obstacle map generation module 132 then may generate an obstacle map, and the obstacle map processing module 131 may process the request from the receiver 110 and provide the generated obstacle map in response.

Using the obstacle map and the approximate location of the positioning receiver 110, the line-of-sight verification routine 112 determines whether one or more of the satellite signals 120 is occluded from the receiver 110. In some cases, the line-of-sight verification routine 112 also uses the known locations of the satellites 120 to make this determination. If no signals are occluded, the original position fix is labeled as having been verified, according to one implementation. If one or more of the signals are occluded, the position fix is identified as potentially erroneous.

In some embodiments, the receiver 111 may include an image capture module onboard the receiver 111, or the receiver 111 may be communicatively coupled to an image capture module. The image capture module may include one or more cameras and/or one or more range scanners capable of imaging part or all of the environment surrounding the device 111, for example. In such a case, an attempted positioning calculation by the receiver 111 may trigger the capture of imagery needed to construct an obstacle map. The imagery may be transferred to the line-of-sight verification routine which constructs the obstacle map and verifies line of sight. Alternatively, the device 111 may trigger the capture of imagery needed to construct and obstacle map, and the imagery may be stored in the memory of the device 111 or on computer-readable media communicatively coupled to a remote server, such as the server 130. This imagery may then be used for line-of-sight verification in post-processing.

Further, in some of the implementations according to which the line-of-sight verification routine 112 takes incident angles of satellite signals into account, the processing routine 113 removes the occluded satellite signals from the data set and calculates the position fix using only the signals that are not occluded. In some implementations, an iterative signal selection routine may be included in the line-of-sight verification routine 112. The iterative signal selection routine analyzes subsets of the available positioning signals until a set of appropriate signals, all having a clear line of sight, are identified. This technique is discussed further with reference to FIG. 12.

In general, line-of-sight verification routines thus identify potentially erroneous position fixes and/or a set of satellite signals with clear line of sight in the context of post-processing verification and real-time corrections for positioning receivers. A line-of-sight verification routine typically (i) constructs or receives an obstacle map generated using transitory, persistent, or transitory and persistent imagery and (ii) uses the obstacle map to identify occluded high-altitude signals and/or an appropriate set of signal sources with clear line of sight.

However, not all atmospheric obstacles completely occlude high-altitude signals. Invisible atmospheric layers introduce error into positioning calculations by delaying the arrival of signals. Predictive models exist which parameterize the atmospheric delay in terms of temperature, pressure, relative or absolute humidity, and other local parameters. These local parameters are not available to receivers and thus the receiver is unable to adequately correct for the atmospheric time delay. In order to calculate a correction, the local parameters must be measured at the time the position fix is calculated. The techniques of the present disclosure correct error introduced by atmospheric delay using supplementary data, such as signals from additional high-altitude sources or weather data services. Devices can use this supplementary data to calculate the local parameters used by predictive models.

Figure 6:
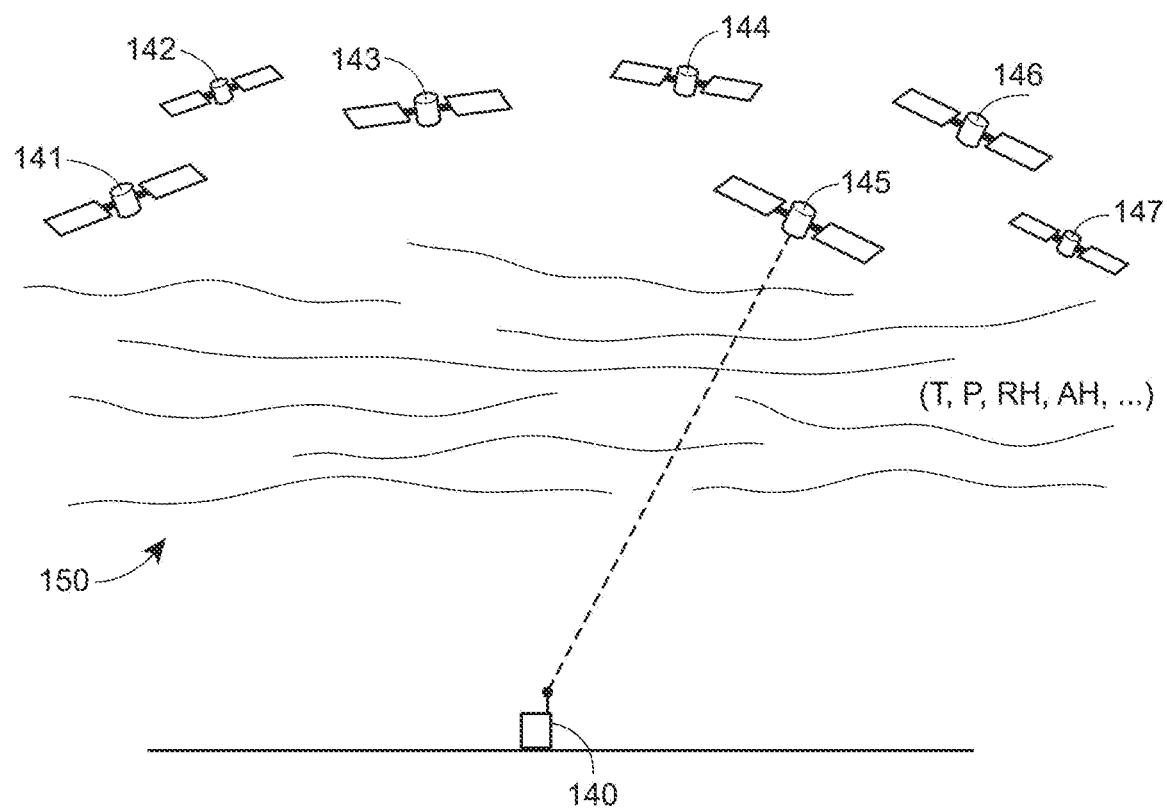
FIG. 6 illustrates an example scenario in which a receiver has access to supplementary satellites to correct positioning errors due to atmospheric parameters.

FIG. 6 illustrates an example scenario where a geographic positioning receiver 140 has a clear line of sight to the satellite sources 141, 142, 143, 144, 145, 146, and 147, but the layers of the atmosphere 150 introduce a time delay for the satellite signals. The receiver 140 only requires four of the seven available satellites to calculate a position fix, and thus three of the seven satellites provide supplementary data. To calculate a correction for the atmospheric delay, the receiver 140 chooses an appropriate atmospheric model using which the receiver 10 can calculate time delay corrections. In this case, the atmospheric model depends on temperature (T), pressure (P), and relative humidity (RH). The receiver 140 uses four of the seven satellite signals 144, 145, 146, and 147 to obtain three position and one time estimate corresponding to a standard position fix, and the receiver 140 uses the supplementary satellite signals 141, 142, and 143 to estimate the atmospheric parameters (T, P, RH). In this way, the delay correction necessitates three additional unknowns in the positioning calculation, but the receiver 140 estimates these unknowns using existing supplementary data.

Figure 7:
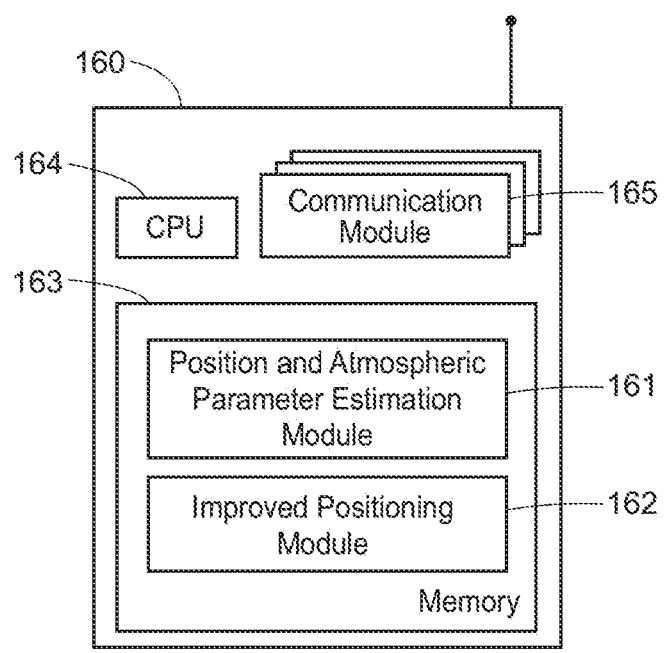
FIG. 7 illustrates an example computing system that improves a position fix based on an atmospheric delay correction.
Figure 8:
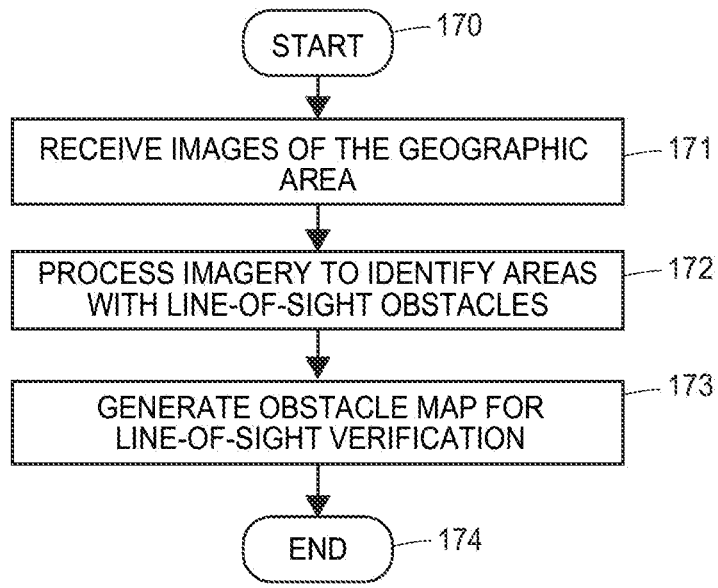
FIG. 8 is a flow diagram of an example method for generating an obstacle map for line-of-sight verification.

FIG. 7 depicts an example geographic positioning receiver 160 that facilitates atmospheric delay corrections based on supplementary data. In an example implementation, the receiver 140 discussed above is similar to the receiver 160. The receiver 160 includes a computer-readable memory 163 and or more processors (e.g., CPUs) 164. The memory 163 stores a position and atmospheric parameter estimation module 161 and an improved positioning module 162 as instructions executable on the processor 164. The receiver 160 also includes a communication module 165 that receives signals from high-altitude sources. The communication module 165 may also provide communication with weather data services. In another implementation, one or both of the modules 161 and 162 are implemented on a network device or in a cloud with which the receiver 160 communicates via the communication modules 165.

When a position fix calculation is initiated, the position and atmospheric parameter estimation module 161 calculates both a position fix based on four high-altitude signals and additional atmospheric parameters based on supplementary data. This supplementary data can be additional signals, such as in the example scenario depicted in FIG. 6, or atmospheric data from a weather data service. The position and atmospheric parameter estimation module 161 selects the number and type of these atmospheric parameters such that they correspond to a known predictive atmospheric model for atmospheric delay. After parameter estimation, the improved positioning module 162 uses the estimated atmospheric parameters along with a predictive atmospheric model to correct the initial position fix. The improved position fix takes into account the influence of decelerating layers of the atmosphere.

The techniques of this disclosure, therefore, correct atmospheric delay based on supplementary data available to a geographic positioning receiver. In addition, the atmospheric delay correction can be combined with a line-of-sight verification routine to account for both occluding and decelerating obstacles.

Next, FIG. 7 illustrates an example method 170 for generating an obstacle map for line-of-sight verification. The method 170 may be implemented in the positioning data server 51 illustrated in FIG. 2 or the server 132 illustrated in FIG. 5, for example.

At block 171, imagery is received from one or more imagery servers. This imagery includes either concurrent transitory imagery, persistent imagery, or a combination of transitory and persistent imagery, depending on the scenario. The imagery corresponds to the area surrounding the approximate geographic location of the geographic positioning receiver.

At block 172, the imagery is processed to identify the areas of the image(s) that correspond to obstacles. Each pixel of an image may be processed based on colors, shapes, etc. to identify obstacles. In one example implementation, a search for these colors and/or shapes is performed over all the pixels available in the image. Pixels corresponding to the obstacle colors, such as shades of gray for buildings, are replaced by black pixels and the remaining non-obstacle pixels are replaced by white pixels. This procedure creates a binary (black and white) two-dimensional map of obstacles. Appropriate color assignments may also be made for any persistent or transitory objects such as trees and/or natural canyons. For example, trees also may be represented as black shapes on the obstacle map.

At block 173, an obstacle map is generated, based on the processed imagery, for line-of-sight verification. The processed images, in which obstacles have been identified, are combined to generate a final obstacle map at some average height above the receiver. This average height may be predefined or it may be calculated on the fly by analyzing the number and composition of the detected obstacles. Alternatively, the average height of the obstacle map may be assigned the value of zero by assuming that the altitude of the obstacles is very small with respect to the altitude of the signal sources and that the signal sources are at a small angle with respect to the normal to the surface of the earth. If both transitory and persistent imagery was processed at block 172, the processed transitory and processed persistent imagery is combined to yield a single obstacle map for line-of-sight verification. In some situations, multiple binary two-dimensional processed images may be generated at block 172, with some binary images representing natural terrain features such as trees and canyons and others representing man-made structures such as building. In this case, the binary images may be directly overlapped to yield the final two-dimensional obstacle map. The areas of the obstacle map representing occlusions would then correspond to a combination of transitory and persistent occluding obstacles. Moreover, in some implementations, a time stamp or an "expiration date" is generated and assigned to the obstacle map (as a field in the metadata, for example).

Figure 9:
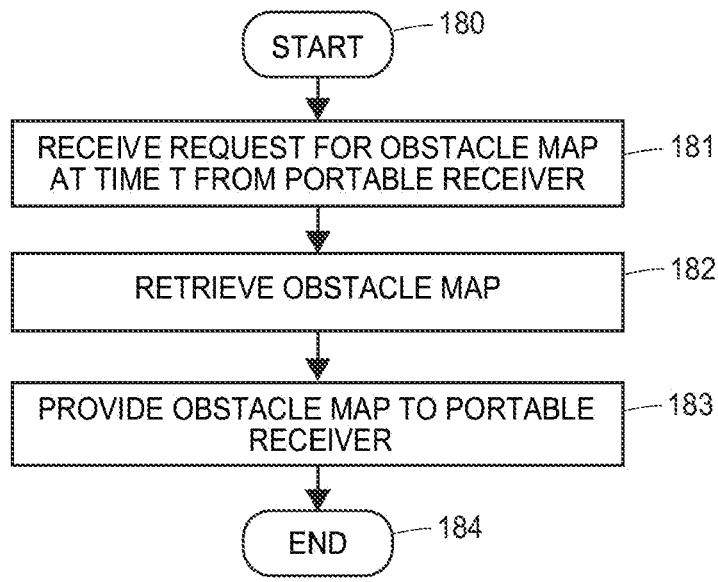
FIG. 9 is a flow diagram of an example method for processing a request for an obstacle map.

FIG. 9 is a flow diagram of example method 180 for processing a request for an obstacle map. The method 180 may be implemented in the obstacle map request processing module 131 illustrated in FIG. 5, for example.

At block 181, a request for an obstacle map is received. The request may be received from a receiver, such as the receiver 110 in FIG. 5. The request may generally indicate a geographic location and specify time T, so that transitory imagery used in the construction of the obstacle map corresponds to time T. The device requesting an obstacle map also may specify the type of obstacles that should be included in the obstacle map. For example, the receiver 110 may specify that the obstacle map should be constructed with only transitory or only persistent imagery. Further, the receiver 110 may specify the average height of obstacles or the type of image processing to be used when generating an obstacle map.

Next (block 182), an obstacle map is generated or retrieved from a database in accordance with the request received at block 181. For example, the obstacle map generation module 132 of FIG. 5 may generate such a map.

At block 183, the obstacle map is provided to the receiver or another requestor. As discussed above, an obstacle map may be used to verify line of sight between a receiver and one or more signal sources. In some cases, a receiver may generate a request for an obstacle map for every positioning calculation. However, the same obstacle map may be used for multiple positioning calculations to reduce the computational overhead. If the relevant obstacles are slow-moving cloud formations, it may be sufficient to request an obstacle map update every one minute, for example, or even less frequently.

Figure 10:
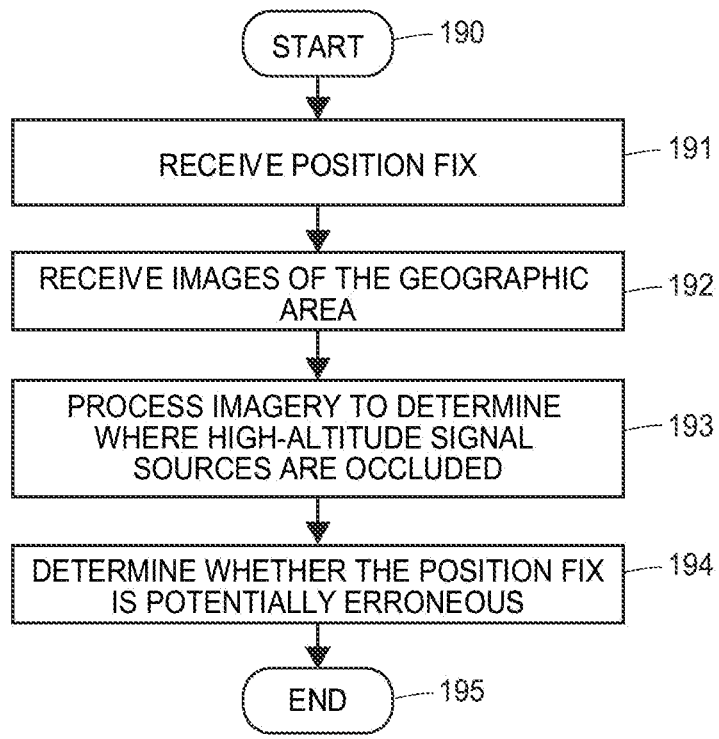
FIG. 10 is a flow diagram of an example method for identifying a potentially erroneous position fix in post-processing.

FIG. 10 illustrates an example method 190 for identifying a potentially erroneous position fix resulting from occluding obstacles during post-processing. The method 190 may be implemented in positioning data server 51 in FIG. 2, for example. However, in other implementations, at least portions of the method 190 may be implemented in a receiver.

At block 191, a position fix based on the positioning data collected by a receiver is received. This position fix represents the approximate location of the receiver at time T. However, this position fix was calculated using signals from satellites or other high-altitude sources that may or may not have been occluded at the time of the positioning calculation.

At block 192, the positioning server receives imagery (persistent, transitory, or a combination of persistent and transitory) via a network cloud, such as the network cloud 60 in FIG. 2. In one implementation, any transitory imagery received, such as that related to tree canopies, at least approximately corresponds to the time T, so that the relevant conditions are replicated in the obstacle map. It is noted, however, that post-processing of data may occur days or months after the collection of the positioning data when environmental conditions of the geographic area have changed completely.

At block 193, the imagery is processed to determine the location of occlusions. An image processing method, such as the method illustrated in FIG. 7, can be used to identify regions of occlusion in the imagery. Transitory or persistent occlusions that have identified can be combined into an obstacle map. Then, at block 194, the obstacle map generated at block 193 is used to identify potentially erroneous position fixes. A line-of-sight verification routine, such as the routine 52 in FIG. 2 or the routine 112 in FIG. 5 compares the direct path between the approximate location of the receiver and the known location of the high-altitude signals with the obstacle map. If the direct path between the approximate location of the receiver and the known location of the high-altitude signals penetrates a region of the obstacle map that corresponds to an occlusion, the position fix is identified as potentially erroneous.

Figure 11:
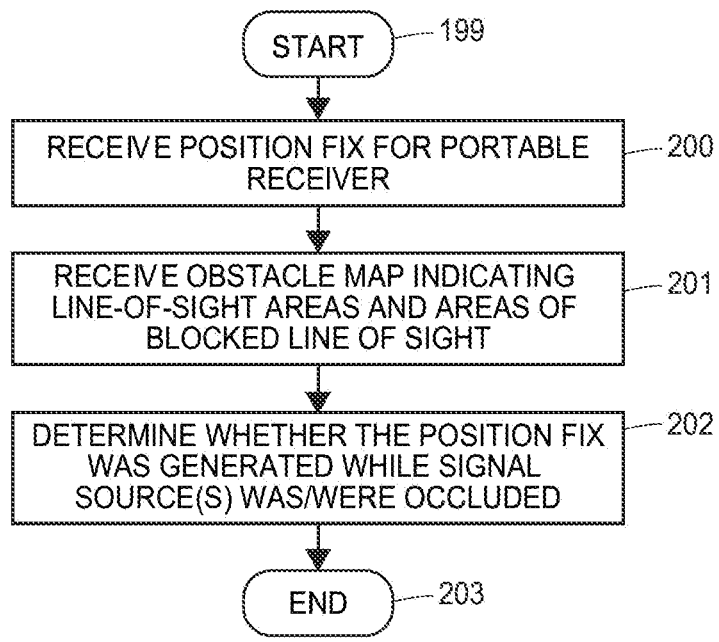
FIG. 11 is a flow diagram of an example method for identifying a potentially erroneous position fix in real-time.

FIG. 11 is a flow diagram of an example method 199 for identifying a potentially erroneous position fix in real-time resulting from occluding obstacles. The method 199 may be implemented in the receiver 110 illustrated in FIG. 5, for example.

At block 200, a receiver receives a position fix based on a plurality of high-altitude signals, such as satellites. This position fix represents the approximate location of the receiver at time T. Next, at block 201, the receiver acquires an obstacle map of the geographic area corresponding to time T from a server, such as the server 131 illustrated in FIG. 5. This obstacle map contains information about the location of transitory, persistent, or transitory and persistent occluding obstacles in the area surrounding the approximate location of the receiver.

At block 202, a line-of-sight verification routine, such as the routine 52 in FIG. 2 or the routine 112 in FIG. 5 compares the direct path between the approximate location of the receiver and the known location of the high-altitude signals with the obstacle map from the server. The approximate position fix is identified a erroneous by comparing the obstacle map and signal path immediately after the position fix is calculated. A potentially erroneous position fix may be disregarded by the receiver or reported with a label of potentially erroneous. Alternatively, the position fix could be recalculated if four signals have a clear line of sight.

Figure 12:
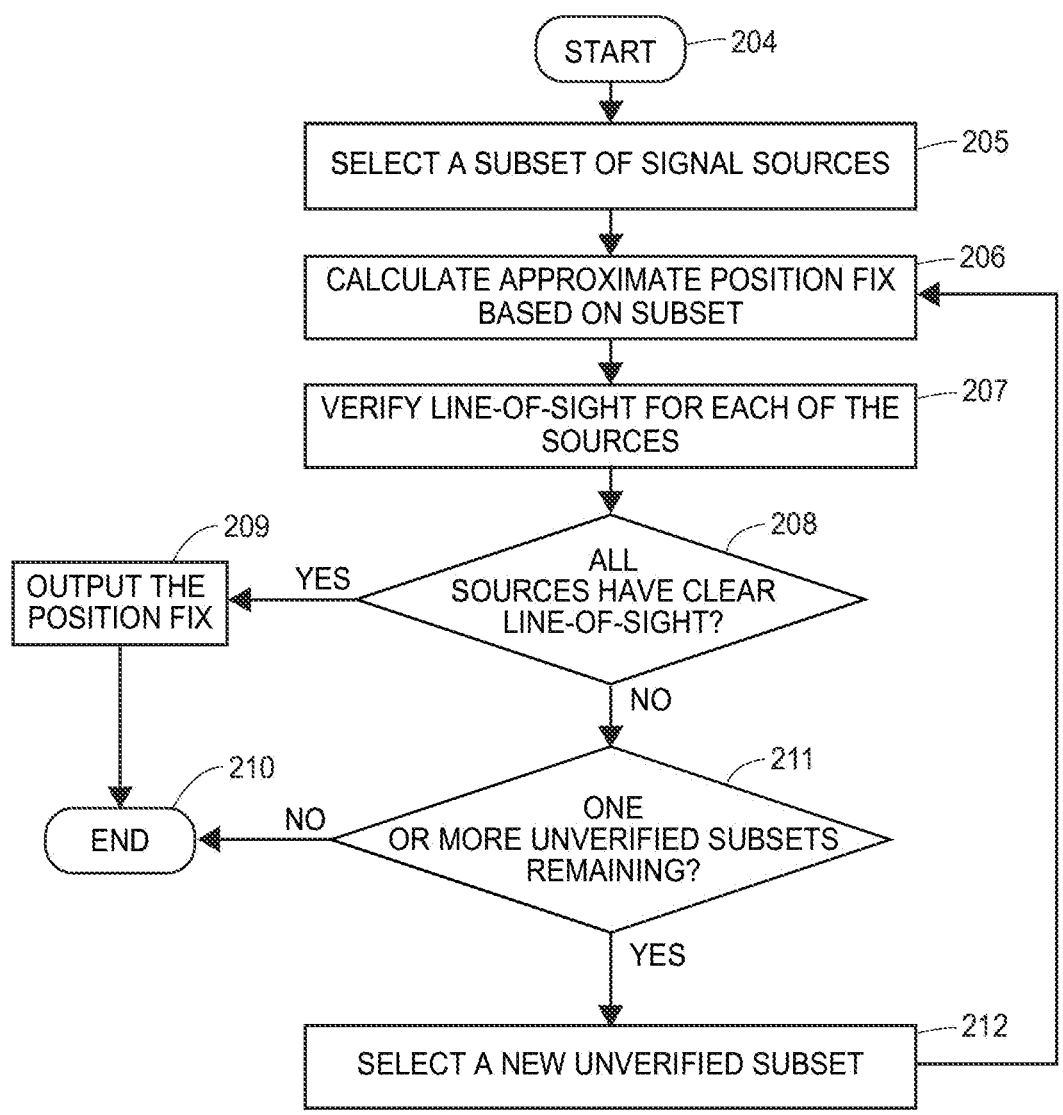
FIG. 12 is a flow diagram of an example method for iteratively selecting a set of signal sources based on line-of-sight verification.

FIG. 12 is a flow diagram of an example method 204 for iteratively selecting a set of signal sources based on line-of-sight verification. A software module executing on a receiver R (e.g., the receiver 110 of FIG. 5), a network server (e.g., the server 130), or another suitable device can execute the method 204 when M signals are required for positioning but N signals are presently available, where M<N.

At block 205, an initial subset, $\sigma_1$, of signal sources, such as satellites, is selected from a larger set S of signals received by the receiver R ($\sigma_1 \subseteq S$). The number of signal sources, M, in the subset $\sigma_1$ is equal to the minimum number of required sources to calculate a position fix. In one example, a set of eight satellites S={$s_1, s_2, s_3, s_4, s_5, s_6, s_7, s_8$} is available to receiver R (N=8), but only four satellites are required to calculate a position fix (M=4). At block 205, a subset of M satellites may be chosen as the initial subset, $\sigma_1$, of satellites according to any suitable principle (e.g., based on signal strength) or even arbitrarily. The initial subset may be $\sigma_1$={$s_1, s_2, s_3, s_4$}, for example.

At block 206, a candidate position fix is calculated using the subset $\sigma_1$. The position fix may correspond to a point $P_1$ that is a possible location of the receiver R. Potentially, each subset $\sigma_i$ ($\sigma_1, \sigma_2$, etc.) may yield a different position fix, $P_i$. In the above mentioned case, sixty-nine M-satellite combinations are possible in addition to {$s_1, s_2, s_3, s_4$}, and, therefore, there are seventy possible position fixes ($P_1, P_2, \ldots, P_{70}$)

At block 207, it is determined whether each of the signal sources in the subset $\sigma_1$ has a clear line of sight to the receiver R if the receiver R is at point $P_1$. The line-of-sight verification may be based on a 3D obstacle map or a 2D obstacle map, depending on the scenario and/or implementation. As discussed above, the line-of-sight verification routine may calculate the direct path between each satellite and the receiver. If one of these paths intersects a 3D obstacle, for example, then that satellite is identified as being occluded (i.e. not having a clear line of sight).

At 208, the line-of-sight verification results for each satellite, $s_i$, in the subset $\sigma_1$ are examined. If each of the satellites in the subset $\sigma_1$ is determined to have a clear line of sight to point $P_1$, the flow continues to block 209, where the candidate position fix, based on the verified subset of satellites, is output or otherwise marked as not having failed line-of-sight verification. However, if one or more of the satellites is occluded, the candidate position fix is rejected, and the flow proceeds to block 211.

It is noted that a position fix output or marked at block 209 corresponds to a point $P_i$ that is not occluded from the satellites used to generate the position fix. Thus, it is possible that the receiver R in fact was positioned at point $P_i$. By contrast, if one or more of the satellites in the subset $\sigma_i$ were occluded from a receiver at point $P_i$, the receiver R probably was not positioned at point $P_i$ at that time, but rather at some other point P'. Because a satellite occluded at point $P_i$ is not necessarily occluded at point P', determining that a certain satellite is occluded when processed as part of the set $\sigma_i$ does not necessarily mean that this satellite in fact was occluded from the receiver R. Thus, this satellite cannot be excluded from further analysis based on the result generated at blocks 206-208.

At block 211, it is determined whether another unverified (i.e. not yet evaluated by the line-of-sight verification routine) subset, $\sigma_2$, of signal sources is available. For the example case mentioned above, if the subset $\sigma_1$ included satellites $\{s_1, s_2, s_3, s_4\}$, subset $\sigma_2$ can include satellites $\{s_1, s_2, s_3, s_5\}$, $\{s_1, s_2, s_3, s_7\}$, or any other unverified combination satellites. If no unverified subsets of signal sources are available (all possible M-satellite combinations have been evaluated by the line-of-sight verification routine), then the method ends (block 210). If the method is forced to end without identifying a subset of sources with clear line of sight, an indication of positioning error may be generated or the method may be restarted after a preset amount of time, for example. However, if another unverified subset, $\sigma_2$, is available, the method continues to block 212.

At block 212, the current subset of signal sources, $\sigma_1$, is replaced by a new unverified subset of signal sources, $\sigma_2$. In the above mentioned example, satellite $s_5$ could replace satellite $s_4$ such that the new subset $\sigma_2=\{s_1, s_2, s_3, s_5\}$. The method then reverts to block 206 where the new subset of signal sources, $\sigma_2$, is used to calculated a new position fix and subsequently evaluated by the line-of-sight verification routine.

In some implementations, the method 205 may continue to evaluate all possible subsets (e.g. $\sigma_1, \sigma_2, \ldots, \sigma_{70}$) of the available signal sources even if all the signal sources, $s_j$, of a specific subset, $\sigma_i$, are verified by the line-of-sight verification routine. In such an example case, the method 205 may produce multiple verified subsets of signal sources and multiple position fixes corresponding to the multiple verified subsets. These multiple position fixes may be averaged to develop a final average position fix, for example. Alternatively, one of the multiple position fixes may be selected as the final position fix based on pre-defined metrics such as proximity to the average of all possible position fixes, $\{P_i\}$.

Figure 13:
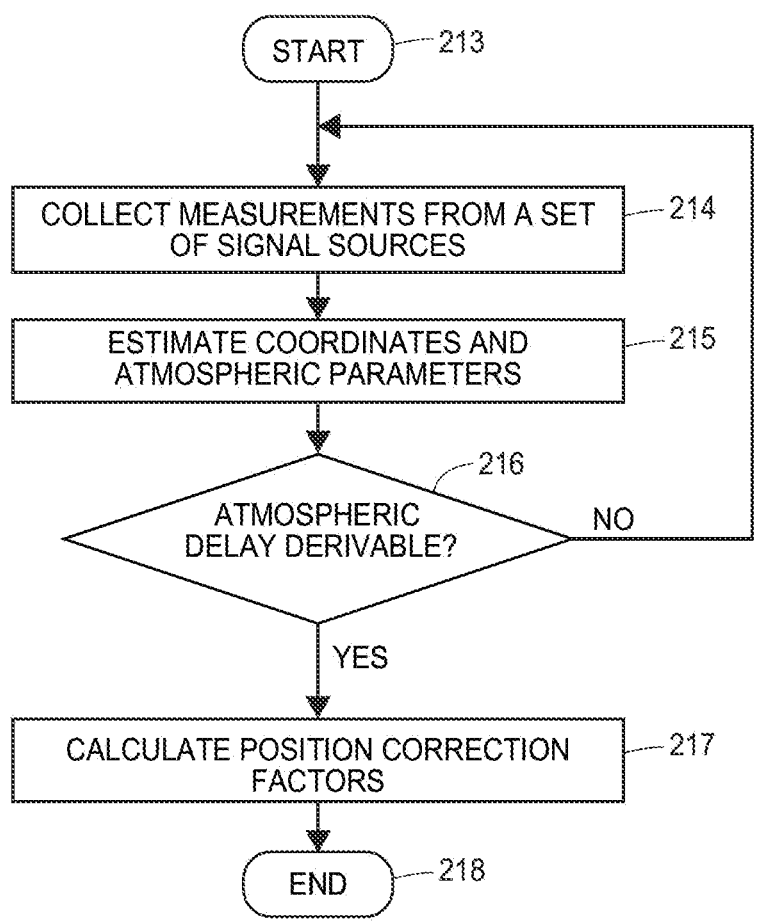
FIG. 13 is a flow diagram of an example method for correcting atmospheric delay.

FIG. 13 is a flow diagram of an example method 213 for correcting atmospheric delay. The method 213 may be implemented in the receiver 160 illustrated in FIG. 7, for example. The atmospheric delay corrections, however, may be applied in either real-time or during post-processing.

At block 214, measurements are collected from a plurality of high-altitude signal sources, such as the satellites illustrated in FIG. 6. The receiver or post-processing server also collects concurrent supplementary data, such as additional signals or weather data. In one example, a receiver has a clear line of sight to more than four satellites. The satellites in addition to the four necessary for positioning are supplementary.

At block 215, both positioning coordinates and atmospheric parameters are estimated. Local atmospheric parameters, such as temperature or pressure, are additional unknowns estimated with the supplementary data collected at block 214. The choice of predictive model for atmospheric delay determines the number and nature of the relevant atmospheric parameters. In one example, a model might be parameterized with temperature, pressure, and relative/absolute humidity, and the use of such a model would introduce three additional unknown parameters. These three unknown parameters could be estimated with the introduction of three additional high-altitude signals, for example. The atmospheric model may be predetermined and constant for any time, or the model may change based on atmospheric conditions, time, date, or other variables. Alternatively, results from multiple models may be averaged.

At block 216, the method inquires if the necessary atmospheric parameters for the predictive model and the positioning coordinates can be estimated simultaneously. If sufficient supplementary data is available and all the parameters can be estimated simultaneously, then the flow proceeds to block 214. On the other hand, if the supplementary data is insufficient to determine the required parameters, the flow returns to block 214. For example, a certain predictive model might require four additional parameters, but only two satellites are available in addition to the four for positioning. In this case, the additional atmospheric parameters are not derivable.

At block 217, the additional atmospheric parameters are used along with the predictive atmospheric model to generate position correction factors that improve the accuracy of the initial position fix. These corrections may be generated for each position calculation. However, the delay corrections may be slowly varying with time. In the case of slowly varying delay corrections, the receiver or post-processing server may apply the same corrections or an averaged correction to many different position fixes. The delay corrections could be updated with a time step of minutes, hours, or longer.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for accounting for atmospheric and terrestrial obstacles in geographic positioning through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-based method for improved geopositioning of a receiver that receives positioning signals from signal sources, the method comprising:
    evaluating at least one candidate position fix that identifies a geographic location, wherein evaluating the at least one candidate position fix includes:
        for a first signal source generating a first candidate position fix using the positioning signals that correspond to the first signal source,
        using imagery of a geographic area associated with the geographic location, determining whether the first signal source has an unobstructed line-of-sight to the geographic location when the first candidate position fix was generated, and
    wherein if the first signal source has an obstructed line-of-sight to the geographic location, selecting a second signal source that does not have an obstructed line-of-sight based on the evaluating; and
    generating a position fix using one or more candidate position fixes for the first signal source if the first signal source had an unobstructed line-of-sight to a respective geographic location or the second signal source if the first signal source has an obstructed line-of-sight to the respective geographic location.

2. The method of claim 1, wherein the first signal source is a subset of signal sources selected from among the signal sources and the second signal source is a new subset of signal sources selected from among the signal sources.

3. The method of claim 2, wherein the subset of signal sources corresponds to a minimum number of signal sources required to generate the positioning fix.

4. The method of claim 1, wherein the signal sources are satellites associated with Global Positioning Service (GPS).

5. The method of claim 1, wherein using the imagery of the geographic area include using a satellite photograph of an area that encompasses geographic locations corresponding to the candidate position fixes.

6. The method of claim 1, wherein using the imagery of the geographic area includes using panoramic photographs captured at a surface level.

7. The method of claim 6, wherein metadata is included with the panoramic photographs.

8. The method of claim 7, wherein the metadata relates to color depth or image resolution.

9. The method of claim 1, wherein generating the position fix includes:
    identifying a plurality of candidate position fixes of the at least one candidate position fix for the first signal source if the first signal source had an unobstructed line-of-sight to the respective geographic location or the second signal source if the first signal source has the obstructed line-of-sight to the respective geographic location, and
    calculating an average of the identified plurality of candidate position fixes to generate the position fix.

10. The method of claim 1, wherein generating the position fix includes:
    identifying the one or more candidate position fixes for the first signal source if the first signal source had an unobstructed line-of-sight to the respective geographic location or the second signal source if the first signal source has the obstructed line-of-sight to the respective geographic location, and
    selecting at least one of the one or more candidate position fixes as the position fix.

11. A system, comprising:
    one or more processors, the one or more processors configured to:
        evaluate at least one candidate position fix that identifies a geographic location, wherein evaluating the at least one candidate position fix includes:
        for a first signal source generating a first candidate position fix using positioning signals that correspond to the first signal source,
        using imagery of a geographic area associated with the geographic location, determining whether the first signal source has an unobstructed line-of-sight to the geographic location when the first candidate position fix was generated, and
        wherein if the first signal source has an obstructed line-of-sight to the geographic location, select a second signal source that does not have an obstructed line-of-sight based on the evaluating; and
    generate a position fix using one or more candidate position fixes for the first signal source if the first signal source had an unobstructed line-of-sight to a respective geographic location or the second signal source if the first signal source has an obstructed line-of-sight to the respective geographic location.

12. The system of claim 11, wherein the first signal source is a subset of signal sources selected from among signal sources and the second signal source is a new subset of signal sources selected from among the signal sources.

13. The system of claim 12, wherein the subset of signal sources corresponds to a minimum number of signal sources required to generate the positioning fix.

14. The system of claim 11, wherein the signal sources are satellites associated with Global Positioning Service (GPS).

15. The system of claim 11, wherein using the imagery of the geographic area include using a satellite photograph of an area that encompasses geographic locations corresponding to the candidate position fixes.

16. The system of claim 11, wherein using the imagery of the geographic area includes using panoramic photographs captured at a surface level.

17. The system of claim 16, wherein:
metadata is included with the panoramic photographs, and the metadata relates to color depth or image resolution.

18. The system of claim 11, wherein generating the position fix includes:
identifying a plurality of candidate position fixes of the at least one candidate position fix for the first signal source if the first signal source had an unobstructed line-of-sight to the respective geographic location or the second signal source if the first signal source has the obstructed line-of-sight to the respective geographic location, and
calculating an average of the identified plurality of candidate position fixes to generate the position fix.

19. The system of claim 11, wherein generating the position fix includes:
identifying the one or more candidate position fixes for the first signal source if the first signal source had an unobstructed line-of-sight to the respective geographic location or the second signal source if the first signal source has the obstructed line-of-sight to the respective geographic location, and
selecting at least one of the one or more candidate position fixes as the position fix.

20. A computer-readable medium storing instructions, which when executed by one or more processors, cause the one or more processors to:
evaluate at least one candidate position fix that identifies a geographic location, wherein evaluating the at least one candidate position fix includes:
for a first signal source generating a first candidate position fix using the positioning signals that correspond to the first signal source,
using imagery of a geographic area associated with the geographic location, determining whether the first signal source has an unobstructed line-of-sight to the geographic location when the first candidate position fix was generated, and
wherein if the first signal source has an obstructed line-of-sight to the geographic location, select a second signal source that does not have an obstructed line-of-sight based on the evaluating; and
generate a position fix using one or more candidate position fixes for the first signal source if the first signal source had an unobstructed line-of-sight to a respective geographic location or the second signal source if the first signal source has an obstructed line-of-sight to the respective geographic location.

\* \* \* \* \*